(12) United States Patent
Acevedo et al.

(10) Patent No.: US 7,189,781 B2
(45) Date of Patent: Mar. 13, 2007

(54) MOISTURE CURABLE, RADIATION CURABLE SEALANT COMPOSITION

(75) Inventors: Margarita Acevedo, Minneapolis, MN (US); Mai T. Nguyen-Misra, Shoreview, MN (US)

(73) Assignee: H.B. Fuller Licensing & Finance Inc., St. Paul, MN (US)

( * ) Notice: Subject to any disclaimer, the term of this patent is extended or adjusted under 35 U.S.C. 154(b) by 86 days.

(21) Appl. No.: 10/387,360

(22) Filed: Mar. 13, 2003

(65) Prior Publication Data

US 2004/0181007 A1    Sep. 16, 2004

(51) Int. Cl.
*C08J 3/00* (2006.01)
*C08K 3/20* (2006.01)
*C08L 75/00* (2006.01)
*C08L 83/00* (2006.01)
*E06B 3/00* (2006.01)

(52) U.S. Cl. .................. 524/588; 52/204.5; 428/34; 428/38; 522/97; 524/589; 524/590; 525/100; 525/101; 525/102; 525/123; 525/455; 528/22; 528/26

(58) Field of Classification Search ............... 524/588, 524/589, 590; 522/97; 52/204.5; 428/34, 428/38; 525/100, 101, 102, 123, 455; 528/22, 528/26

See application file for complete search history.

(56) References Cited

U.S. PATENT DOCUMENTS

| | | |
|---|---|---|
| 3,632,557 A | 1/1972 | Brode et al. |
| 4,345,053 A | 8/1982 | Rizk et al. |
| 4,352,858 A | 10/1982 | Stanley |
| 4,645,816 A | 2/1987 | Pohl et al. |
| 4,684,538 A | 8/1987 | Klemarczyk |
| 4,775,719 A | 10/1988 | Markevka et al. |
| 4,808,255 A | 2/1989 | Markevka et al. |
| 4,820,368 A | 4/1989 | Markevka et al. |
| 4,824,875 A | 4/1989 | Gutek |
| 4,839,455 A | 6/1989 | Fong |
| 4,960,844 A | 10/1990 | Singh |
| 4,965,117 A | 10/1990 | Lautenschlaeger et al. |
| 5,013,631 A | 5/1991 | Su |
| 5,124,210 A | 6/1992 | Fong |
| 5,177,916 A | 1/1993 | Misera et al. |
| 5,225,412 A | 7/1993 | Hrib et al. |
| 5,326,845 A | 7/1994 | Linden |
| 5,350,803 A | 9/1994 | Prejean |
| 5,397,648 A | 3/1995 | Babu et al. |
| 5,428,209 A | 6/1995 | Babu et al. |
| 5,478,427 A | 12/1995 | Huver et al. |
| 5,653,073 A | 8/1997 | Palmer |
| 5,665,823 A | 9/1997 | Saxena et al. |
| 5,856,404 A | 1/1999 | Choung et al. |
| 5,860,835 A | 1/1999 | Ohsumi |
| 5,873,203 A | 2/1999 | Thiel |
| 6,055,783 A | 5/2000 | Guhl et al. |
| 6,204,350 B1 | 3/2001 | Liu et al. |
| 6,221,978 B1 | 4/2001 | Li et al. |
| 6,245,145 B1 | 6/2001 | Lisec |
| 6,286,288 B1 | 9/2001 | France |
| 6,303,731 B1 | 10/2001 | Carlson et al. |
| 6,355,317 B1 | 3/2002 | Reid et al. |
| 6,387,449 B1 | 5/2002 | Reid et al. |
| 6,401,428 B1 | 6/2002 | Glover et al. |
| 6,414,077 B1 | 7/2002 | Barron et al. |
| 6,451,870 B1 | 9/2002 | DeCato et al. |
| 6,463,706 B1 | 10/2002 | Guhl et al. |
| 6,498,210 B1 | 12/2002 | Wang et al. |
| 6,750,309 B1 * | 6/2004 | Chu et al. ............... 528/28 |
| 2001/0051260 A1 | 12/2001 | Johnson et al. |
| 2002/0100550 A1 * | 8/2002 | Mahdi et al. ............ 156/329 |
| 2002/0189743 A1 | 12/2002 | Hornung et al. |
| 2002/0194813 A1 | 12/2002 | Virnelson et al. |
| 2004/0059069 A1 | 3/2004 | Grimm et al. |

FOREIGN PATENT DOCUMENTS

| | | |
|---|---|---|
| EP | 0 608 891 B1 | 8/1994 |
| EP | 0 646 632 A1 | 4/1995 |
| EP | 0 549 228 B1 | 8/1996 |
| EP | 0 776 956 A2 | 6/1997 |
| EP | 0 852 280 B1 | 7/1998 |
| EP | 1 052 362 A2 | 11/2000 |
| EP | 0 826 701 B1 | 12/2000 |
| WO | WO 98/25001 | 6/1998 |
| WO | WO 98/53008 | 11/1998 |
| WO | WO 99/14169 | 3/1999 |
| WO | WO 01/05846 | 1/2001 |

OTHER PUBLICATIONS

"Shadow Curing of UV Adhesives", George W. Ritter, Proceedings of the 24th Annual Meeting of the Adhesion Society, p. 83, Feb. 2001, (1 page).

Next Generation Radiation Curable PSA's Based on Acrylated Polyesters, Acevedo et al, published in RadCureLetter in May 1999, pp. 68-71.

* cited by examiner

*Primary Examiner*—Patrick D. Niland

(57) ABSTRACT

Sealant composition comprising at least one of a) a moisture curable, radiation curable polyurethane prepolymer or b) a blend comprising a moisture curable polyurethane prepolymer and a radiation curable prepolymer. Also disclosed are insulating glass assemblies that use such dual-cure sealant compositions.

43 Claims, No Drawings

MOISTURE CURABLE, RADIATION CURABLE SEALANT COMPOSITION

BACKGROUND

The invention relates to a moisture curable, radiation curable sealant composition. More particularly, the invention relates to such sealant compositions for use in insulating glass assemblies.

Insulating glass assemblies such as insulating glass units and insulating sash assemblies often include a pair of glass sheets maintained in a fixed spaced relation to each other by a spacing and sealing structure that extends around the periphery of the inner facing surfaces of the glass sheets to define a sealed and insulating space between the glass sheets. In the case of insulating sash assemblies, the glass panes are adhered to the spacer that is an integral part of the sash frame. The glass sheets are usually attached to the structure by a sealant or adhesive composition.

Sealants and adhesive compositions have been used to seal the edges of the insulating glass assembly so as to establish a barrier that prevents moisture from penetrating into the interior of the assembly. Insulating sash assemblies are described, e.g., in U.S. Pat. No. 6,286,288. Sealant compositions have also been used to bond an insulating glass assembly, e.g., an insulating glass unit, to a frame. This process is often referred to as "back bedding." Back bedding is discussed in, e.g., U.S. Pat. Nos. 6,286,288 and 5,856,404 and incorporated herein. In the fabrication of door and window units back bedding sealants are often used to seal and bond panes of glass to retain the pane in position within a frame, to provide a weather proof seal, to reinforce the structural strength of the assembly, or a combination thereof.

A variety of compositions have been used in constructing insulating glass assemblies. One part polyurethane compositions, for example, have been used to bond glass to a variety of substrates relying on the thermoplastic component to supply the green strength, which necessitates higher application temperature. In addition, such one part polyurethane compositions rely on moisture curing reactions for final performance, which tend to be relatively slow.

Dual-cure compositions in which ultraviolet light and moisture are used to cure the composition have been used in a variety of applications including, e.g., structural adhesives as described, e.g., in EP 646632A1, WO 0105846, and WO 98/53008.

A two package UV curable conformal coating has been described in U.S. Pat. No. 5,013,631.

A photocurable resin composition for use in coatings comprising a component with dual functionality, acrylate and silane, is described in EP 0 549 228 B1. This is a low molecular weight compound that is intended to improve adhesion at high temperatures. U.S. Pat. No. 5,478,427 describes adhesives based on macromers having acrylate and isocyanate functionality, but in this case to achieve adhesion the composition has to be applied on both substrates to be bonded.

Other compositions described in U.S. Pat. No. 4,965,117 and known as "command-cure" compositions are applied as a strip or a tape and cured by exposure to ultraviolet radiation.

SUMMARY

In one embodiment, the invention relates to a dual-cure sealant composition comprising:
 a) a moisture curable, radiation curable polyurethane prepolymer; and
 b) at least about 10% by weight filler.

In another embodiment, the invention relates to a dual-cure sealant composition comprising a blend comprising:
 a) a moisture curable polyurethane prepolymer, and
 b) a radiation curable polymer; and
 c) at least about 10% by weight filler.

The invention also relates to a dual-cure polyurethane prepolymer comprising the reaction product of:
 a) a polyol selected from the group consisting of hydrophobic polyester polyols, polydiene block polyols, polyolefin polyols, or a combination thereof,
 b) polyisocyanate, and
 c) hydrogen active (meth)acrylate, said prepolymer comprising less than about 30% molar equivalents acrylate functional groups based on the molar equivalents of the prepolymer.

The invention also relates to a dual-cure polyurethane prepolymer comprising the reaction product of:
 a) a polyol selected from the group consisting of hydrophobic polyester polyols, polydiene block polyols, polyolefin polyols, or a combination thereof,
 b) polyisocyanate,
 c) hydrogen active (meth)acrylate, and
 d) hydrogen active organofunctional silane, said prepolymer comprising less than about 15% molar equivalents silane functional groups based on the molar equivalents of the prepolymer.

The invention also relates to a dual-cure sealant composition comprising:
 a) polyurethane prepolymer comprising isocyantate functional groups, silane functional groups, or combination thereof; and
 b) acrylate oligomer derived from polyol selected from the group consisting of polyolefin polyols having a functionality of about 2, polydiene block polyols having a functionality of about 2, and combinations thereof.

In yet another embodiment, the invention relates to an insulating glass assembly that includes at least two panes of glass, a spacer, and a sealant composition, said glass being bonded to said spacer through said sealant composition, said sealant composition comprising at least one of a) a moisture curable, radiation curable polyurethane prepolymer; or b) a blend comprising a moisture curable polyurethane prepolymer and a radiation curable prepolymer.

The invention features dual-cure (radiation curable and moisture curable) adhesive compositions and sealant compositions that exhibit moisture barrier properties and function as a structural sealant in an insulating glass assembly. The compositions are substantially solvent-free (preferably completely solvent-free) and single component (i.e., one part) and can be applied at room temperature. The compositions develop immediate handling-strength (i.e., green strength) upon partial cure by radiation curing.

Other features and advantages will be apparent from the following description of the preferred embodiments and from the claims.

Glossary

In reference to the invention, these terms have the meanings set forth below:

The term "dual cure" refers to a composition that cures upon exposure to radiation and moisture.

DETAILED DESCRIPTION

The dual-cure sealant composition of the present invention includes a moisture curable and radiation curable polyurethane prepolymer, a blend of a moisture curable polyurethane prepolymer and a radiation curable polymer, or a combination thereof. The sealant composition develops an initial green strength through photopolymerizing or crosslinking of the ethylenically unsaturated groups on exposure to radiant energy. Preferred compositions exhibit significant initial green strength immediately after exposure to UV curing and maintain sufficient green strength even at higher temperatures, allowing the assembly constructions to be shipped immediately after manufacture. Such compositions thus provide an advantage over typical hot-melt sealant compositions. It is believed that the green strength of the present compositions is built by polymerizing the acrylate double bonds, thus creating a network, even though lightly crosslinked, and not by a thermoplastic component that melts at the softening temperature of the compositions prior to being moisture cured. The final properties of the composition result from a subsequent reaction of the moisture curing functionalities with moisture.

The sealant composition is a one part composition that can be applied at ambient temperature. The sealant composition preferably exhibits an initial green strength of at least about 10 psi, preferably at least about 15 psi, at 110° F. (about 43.3° C.). The sealant composition preferably generates little to no volatile organic components and provides a moisture barrier and exhibits a moisture vapor transmission rate no greater than about 10 $g/m^2$/day, more preferably no greater than about 9 $g/m^2$/day, most preferably no greater than about 8 $g/m^2$/day, when in the form of a film having a thickness of about 60 mils. The sealant composition also preferably exhibits an elongation of at least about 80%, more preferably at least about 200%, and preferably exhibits a Tg less than about 10° C., more preferably less than about $-10°$ C. The sealant composition also preferably has a slump of less than about 0.1 inch (about 2.5 mm) when tested in accordance with ASTM D-2202.

Moisture Curable, Radiation Curable Polyurethane Prepolymers

Moisture curable, radiation curable polyurethane prepolymers, hereinafter also referred to as "dual cure" prepolymers, include at least one first functional group that is capable of polymerizing upon exposure to moisture (moisture curable) and at least one second functional group that is capable of polymerizing upon exposure to radiation (radiation curable). Moisture curable functional groups include, e.g., isocyanate functional groups, silane functional groups, and combinations thereof. Radiation curable groups include ethylenically unsaturated groups, which include, e.g., (meth)acrylate, acryl groups (e.g., acrylamide and acryloxy), methacryl groups (e.g., methacrylamide and methacryloxy), and akenyl groups (e.g., vinyl, allyl, and hexenyl).

The functional groups can be located pendant, terminal, or a combination thereof, to the polyurethane prepolymer. Preferably the functional groups are located terminally on the prepolymer, i.e., the prepolymer is endcapped with functional groups.

The number of reactive groups present on the prepolymer is primarily controlled by the desired prepolymer(s) equivalent weight. The higher the molecular weight of the prepolymers, the higher the elongation of the final products. However, this in turn, lowers the reactive functionality present to achieve initial green strength. To obtain the desired properties, the functionality of the prepolymers has to be balanced by adjusting the molar equivalents of each component in the resulting prepolymer.

The moisture curable, radiation curable polyurethane prepolymer preferably includes the reaction product of a polyol, a polyisocyanate, a hydrogen active (meth)acrylate, and optionally a hydrogen active organofunctional silane, and optionally a monofunctional alcohol The dual-cure prepolymer preferably has less than about 30% molar equivalents, more preferably less than about 20% molar equivalents, most preferably less than about 15% molar equivalents of (meth)acrylate functional groups based on the total molar equivalents in the prepolymer, and less than about 15% of molar equivalents, more preferably less than about 10%, most preferably less than about 5%, molar equivalents of silane groups based on the molar equivalents of the prepolymer. When a monofunctional alcohol is included, it is preferably present in an amount less than about 5% molar equivalents based on the molar equivalents of the prepolymer.

Preferred moisture curable, radiation curable polyurethane prepolymers have a number average molecular weight (Mn) of from about 2000 to about 50,000, more preferably from about 2500 to about 20,000, most preferably from about 3000 to about 15,000 g/mole. The moisture curable, radiation curable polyurethane prepolymer preferably is polydisperse, i.e., the ratio of the weight average molecular weight (Mw) to the number average molecular weight (Mn) (i.e., Mw/Mn) is at least about 1.8, preferably at least about 2.

The moisture curable, radiation curable prepolymer is prepared by first reacting polyol and polyisocyanate to form an isocyanate functional prepolymer. Preferably the polyol is reacted with excess diisocyanate (i.e., the amount of isocyanate functional groups present in the reaction mixture is greater than the number of hydroxy equivalents present in the reaction mixture) in a first step to form an isocyanate functional polyurethane prepolymer. Preferably the ratio of isocyanate groups to hydroxy groups in the reaction mixture is sufficient to obtain an isocyanate concentration in the final prepolymer of from about 1% by weight to about 10% by weight, as measured by ASTM D-2572-80. Preferably the ratio of isocyanate groups to hydroxy groups in the reaction mixture is from about 1.1:1 to about 4:1, more preferably from about 1.2:1 to about 2.5:1. Preferred isocyanate functional polyurethane prepolymers have an average functionality (i.e., average number of functional groups) of at least 2, more preferably at least about 1.8, most preferably at least about 2.0, preferably no greater than about 3.0.

The isocyanate functional prepolymer is then reacted with a compound that includes a hydrogen reactive group (e.g., a hydroxyl, an amine or a mercapto) and a (meth)acrylate group. Alternatively, the isocyanate functional prepolymer can be reacted with a monofunctional alcohol to cap a portion of the isocyanate functionality, prior to further reaction. The resulting (meth)acrylate functional prepolymer can then be further reacted with a hydrogen active organofunctional silane to obtain a dual-cure prepolymer bearing both silane and (meth)acrylate groups.

Polyisocyanates

Useful polyisocyanate include any suitable isocyanate having at least two isocyanate groups including, e.g., aliphatic, cycloaliphatic, aralphatic, arylalkyl, alkylaryl, and aromatic isocyanates, and mixtures thereof. Suitable diisocyanates include, e.g., trimethylene diisocyanate, tetramethylene diisocyanate, hexamethylene diisocyanate, pentamethylene diisocyanate, 2,4,4-trimethylhexamethylene diisocyanate, dodecamethylene diisocyanate, 2,2,4-trimethylhexamethylene diisocyanate, dodecamethylene diisocyanate, 1,3-cyclopentane diisocyanate, 1,4-cyclohexane diisocyanate, 1,3-cyclohexane diisocyanate, 4,4'-methylenebis(cyclohexylisocyanate), methyl 2,4-cyclohexanediisocyanate, methyl 2,6-cyclohexanediisocyanate, 1,4-bis(isocyanatomethyl)cyclohexane, 1,3-bis(isocyanatomethyl)cyclohexane, m-phenylene diisocyanate, p-phenylene diisocyanate, 4,4'-diphenyl diisocyanate, 1,5-naphthalene diisocyanate, 4,4'-diphenylmethane diisocyanate, diphenylmethane diisocyanate, 2,4-tolylene diisocyanate, 2,6-tolylene diisocyanate, 4,4'-toluidine diisocyanate, dianilidine diisocyanate, 4,4'-diphenyl ether diisocyanate, 1,3-xylylene diisocyanate, 1,4-xylylene diisocyanate, omega, omega'-diisocyanato-1,4-diethylbenzene, methylene bis(4-cyclohexyl isocyanate), tetramethylxylene diisocyanate, toluene diisocyanate, 4,4' methylene diphenyl diisocyanate, blends of 2,4' methylene diphenyl diisocyanate and 4,4'methylene diphenyl diisocyanate, 2',4'-diphenyl methane diisocyanate, and naphthalene-1,5-diisocyanate, and mixtures thereof. Other useful isocyanates are disclosed in, e.g., U.S. Pat. Nos. 6,387,449, 6,355,317, 6,221,978, 4,820,368, 4,808,255, 4,775,719, and 4,352,858, and incorporated herein.

Particularly preferred diisocyanates are blends of 2,4'-methylene diphenyl diisocyanate and 4,4-methylene diphenyl diisocyanate.

Useful commercially available aromatic isocyanates include, e.g., aromatic isocyanates available under the trade designations MONDUR ML from Bayer (Pittsburgh, Pa.), ISONATE 50 OP and ISONATE 125M from Dow Chemical Company (Midland, Mich.), and LUPRANATE MI from BASF (Germany).

Examples of other suitable diisocyanates include 1,2-diisocyanatoethane, 1,3-diisocyanatopropane, 1,2-diisocyanatopropane, 1,4-diisocyanatobutane, 1,5-diisocyanatopentane, 1,6-dissocyanatohexane, bis (3-isocyanatopropyl) ether, bis(3-isocyanatopropyl) sulfide, 1,7-diisocyanatoheptane, 1,5-diisocyanato-2,2-dimethylpentane, 1,6-diisocyanate-3-methoxyhexane, 1,8-diisocyanatoctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 4-diisocyanatobenze, 1,3-diisocyanato-o-xylene, 1,3-diisocyanato-p-xylene, 1,3-diisocyanato-m-xylene, 2,4-diisocyanto-1-chlorobenzene, 2,4-diisocyanato-1-nitro-benzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 16-hexamethylene diisocyanate, 1,4-tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-cyclohexane diisocyanate, hexahydrotoluene diisocyanate, 1,5-napthalene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-dimethyl-4,4'-diphenylmethane diisocyanate and 3,3'-dimethyldiphenylmethane-4,4'-diisocyanate and 3,3'-dimethyldiphenylmethane-4,4,-diisocyanate.

Examples of suitable polyisocyanates include, e.g., triisocyanates, e.g., 4,4',4"-triphenylmethane triisocyanate and 2,4,6-toluene triisocyanate, tetraisocyanates, e.g., 4,4'-dimethyl-2,2'-5,5'-diphenylmethane tetraisocyanate, and polymethylene polyphenylene polyisocyanate.

Polyol

Suitable polyols useful in the preparation of the prepolymer include, e.g., diols, triols and mixtures thereof. Preferred polyols include polyester polyols, polyolefin diols, polydiene block polyols, and combinations thereof. Preferred polyols have a functionality of at least about 1.5, more preferably at least about 1.8, most preferably at least about 2, preferably no greater than about 4.0, more preferably no greater than about 3.5, most preferably no greater than about 3.0. Preferred polyols are amorphous, have a Tg less than about 0° C., preferably less than about −20° C., and a molecular weight greater than about 500 g/mole, more preferably from greater than about 500 g/mole to about 10,000 g/mole, most preferably from about 1000 g/mole to about 4000 g/mole. Preferred polyols are hydrophobic, preferably predominantly hydrocarbon in structure.

Useful classes of polyols include, e.g., polyester polyols including, e.g., lactone polyols and the alkyleneoxide adducts thereof, and dimer acid-based polyester polyols, specialty polyols including, e.g., polybutadiene polyols, hydrogenated polybutadiene polyols, polycarbonate polyols, hydroxy alkyl derivatives of bisphenol A (e.g., bis(2-hydroxyethyl) bisphenol A), polythioether polyols, fluorinated polyether polyols, acrylic polyols, alkylene oxide adducts of polyphenols, polytetramethylene glycols, functional glycerides (e.g., castor oil), and polyhydroxy sulfide polymers.

Useful polyester polyols are prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. phthalic acid, terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, succinic acid, succinic anhydride, glutaric acid, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, and fumaric acid), and alicyclic dicarboxylic acids (e.g. 1,3-cyclohexanedicarboxylic acid, and 1,4-cyclohexanedicarboxylic acid).

Examples of suitable polyols from which polyester polyols can be derived include ethylene glycols, propane diols (e.g., 1,2-propanediol and 1,3-propanediol), butane diols (e.g., 1,3-butanediol), 1,5-pentanediol, 1,6-hexanediol, 1,8-octanediol, 1,10-decanediol, neopentyl glycol, diethylene glycol, triethylene glycol, tetraethylene glycol, polyethylene glycols, polypropylene glycols (e.g., dipropylene glycol and tripropylene glycol) 1,4-cyclohexanedimethanol, 1,4-cyclohexanediol, dimer diols, bisphenol A, bisphenol F, hydrogenated bisphenol A, and hydrogenated bisphenol F, glycerol, and combinations thereof.

Examples of useful polyester polyols include polyglycol adipates, polyethylene terephthalate polyols, polycaprolactone polyols and polycaprolactone triols.

Suitable commercially available polyols include, e.g., dimer acid-based polyester polyols available under the PRIPLAST series of trade designations including, e.g., PRIPLAST 3187, 3190, 3196, and 3197 from UNIQEMA (New Castle, Del.), polybutadiene polyols available under the trade designations POLYBD R-20LM, R-45HT, and R-45M from Atofina Chemicals, Inc. (Exton, Pa.), and hydrogenated polybutadiene polyols available under the trade designation POLYTAIL from Mitsubishi Chemical Corp. (Japan).

Hydrogen Active Monofunctional (Meth)Acrylates

Suitable hydrogen active monofunctional (meth)acrylates include, e.g., hydroxyalkyl acrylates (e.g., 2-hydroxyethylacrylate (HEA), 2-hydroxymetylacrylate (HEMA), 2-hydroxypropylacrylate, 3-hydroxypropylacrylate (HPA) and 2-hydroxypropyl methacrylate, 3-hydroxypropyl methacrylate, 1,3-dihidroxypropylacrylate and 2,3-dihidroxypropylacrylate and methacrylate, 2-hydroxyethylacrylamide and methacrylamide, N-alkyl-N-hydroxyethylacrylamides and methacrylamides, 4-hydroxybutyl acrylate (HBA), hydroxyehyl-betacarboxyehtylacrylate, hydroxyhexyl acrylate, and hydroxyoctyl methacrylate.

Useful hydroxyethylacrylates and hydroxypropylacrylates are commercially available from Dow Chemical (Midland Mich.) and Osaka Organic Chemical Industry Ltd. (Osaka, Japan). Useful hydroxybutyl acrylates are commercially available from Osaka Organic Chemical Industry Ltd. Useful hydroxy polyester acrylates are commercially available under the TONE MONOMER M-100 trade designation from Dow Chemical Company and VISCOAT 2308 from Osaka Organic Chemical Industry Ltd. Useful hydroxy polyether acrylates are commercially available under the ARCOL R-2731 trade designation from Lyondell Chemicals, Huston, Tex.

Hydrogen Active Organofunctional Silane

Any hydrogen active organofunctional silane that includes at least one functional group (e.g., hydrogen) that is reactive with an isocyanate group of the polyurethane prepolymer, and at least one silyl group can be used. Examples of useful silyl groups include alkoxysilyls, aryloxysilyls, alkyloxyiminosilyls, oxime silyls, and amino silyls. Preferred hydrogen active organofunctional silanes include, e.g., aminosilanes (e.g., secondary amino-alkoxysilanes and mercapto-alkoxysilanes. Examples of suitable aminosilanes include phenyl amino propyl trimethoxy silane, methyl amino propyl trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted 4-amino 3,3-dimethyl butyl trimethoxy silane, amino propyl triethoxy silane and mixtures thereof, specific examples of which include N-methyl-3-amino-2-methylpropyltrimethoxysilane, N-ethyl-3-amino-2-methylpropyltrimethoxysilane, N-ethyl-3-amino-2-methylpropyldiethoxysilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-3-amino-1-methyl-1-ethoxy) propyltrimethoxysilane, N-ethyl-4-amino-3,3-dimethylbutyldimethoxymethylsilane, N-ethyl-4-amino-3,3-dimethylbutyltrimethoxysilane, bis-(3-trimethoxysilyl-2-methylpropyl)amine, N-(3'-trimethoxysilylpropyl)-3-amino-2-methylpropyltrimethoxysilane, N,N-bis[(3-triethoxysilyl)propyl]amine, N,N-bis[(3-tripropoxy-silyl)propyl]amine, N-(3-trimethoxysilyl) propyl-3-[N-(3-trimethoxysilyl)-propylamino]propionamide, N-(3-triethoxysilyl) propyl-3-[N-3-triethoxysilyl)-propyl-amino]propionamide, N-(3-trimethoxysilyl) propyl-3-[N-3-triethoxysilyl)-propylamino] propionamide, 3-trimethoxysilylpropyl 3-[N-(3-trimethoxysilyl)-propylamino]-2-methyl propionate, 3-triethoxysilylpropyl 3-[N-(3-triethoxysilyl)-propylamino]-2-methyl propionate, 3-trimethoxysilylpropyl 3-[N-(3-triethoxysilyl)-propylamino]-2-methyl propionate, gamma-mercaptopropyl-trimethoxysilane and N,N'-bis((3-trimethoxysilyl)propyl)amine.

Useful commercially available aminosilanes include, e.g., aminosilanes available under the SILQUEST series of trade designations including, e.g., SILQUEST A-1170, SILQUEST A-1110, SILQUEST Y-9669 and SILQUEST A-15 from OSi Specialties-Crompton Corp. (Greenwich, Conn.), under the DYNASYLAN series of trade designations including, e.g., DYNASYLAN 1189 N-(n-butyl)aminopropyltrimethoxysilane and DYNASYLAN MTMO 3-mercaptopropyl trimethoxy silane both of which are available from Degussa Corporation (Naperville, Ill.), and under the A-189 gamma-mercaptopropyltrimethoxysilane trade designation from OSi Specialties-Crompton Corp.

Useful methods of preparing silane functional polyurethane prepolymers are described, e.g., in U.S. Pat. Nos. 3,632,557, 4,345,053, 4,645,816 and 4,960,844, and incorporated herein.

One example of a useful method of preparing silane functional polyurethane prepolymers having pendant or terminal silane functional groups includes the reaction of an isocyanato organofunctional silane with polyhydroxy functional polyurethane prepolymer, or the acrylate functional, hydroxy functional polyurethane prepolymer. Polyhydroxy functional polyurethane prepolymers can be prepared as described above with respect to the polyisocyanate functional polyurethane prepolymers, with the exception that the reaction mixture has a stoichiometric excess of polyol relative to the diisocyanate component so as to form a hydroxyl-functional polyurethane prepolymer. Preferably the ratio of hydroxy groups to isocyanate groups in the reaction mixture is from about 1.1:1 to about 4:1, more preferably from about 1.2:1 to about 2.5:1.

The hydroxyfunctional polyurethane prepolymer is then reacted with one or more isocyanated silanes, e.g., isocyanated silanes having the formula OCN-R-Si(X)m(—OR$^1$)3-m wherein m is 0, 1 or 2, each R$^1$ is alkyl containing from 1 to 4 carbon atoms, preferably methyl or ethyl, each X is alkyl containing from 1 to 4 carbon atoms, preferably methyl or ethyl, and R is a difunctional organic group, preferably straight or branched difunctional alkyl containing from 2 to 6 carbon atoms such that the hydroxyl groups of the prepolymer are capped with isocyanate silane. Silane cappers suitable for the capping of the active hydrogen terminal or pendant atoms bearing urethane prepolymers are represented by the general formula OCN-R-Si(X)m(—OR$^1$)3-m wherein R, R$^1$, X and m are as defined above. A number of useful structures for such isocyanato alkoxysilane compounds are disclosed in, e.g., U.S. Pat. No. 4,146,585 (columns 4 and 5), and incorporated herein. Preferred isocyanato alkoxysilanes include, e.g., gamma-isocyanatopropyl-triethoxysilane and gamma-isocyanatopropyl-trimethoxysilane, commercially available examples of which are available under the trade designation SILQUEST A-35 and SILQUEST A-25 from OSi Specialties-Crompton Corp.

Monofunctional Alcohol

Preferred monofunctional alcohols for use in the preparation of the polyurethane prepolymer are amorphous or exhibit a melting point of no greater than about 50° C. The monofunctional alcohol is preferably an alkyl alcohol having from 4 to 18 carbon atoms, more preferably from 8 to 16 carbon atoms, most preferably from 12 to 16 carbon atoms, and a molecular weight of from about 74 g/mol to about 1000 g/mol, more preferably from about 130 g/mol to about 500 g/mol. Useful monofunctional alcohols also have an OH number of from about 750 to about 56, preferably from about 430 to about 110.

Suitable monofunctional alcohols include, e.g., alkyl, alkylene, alkynyl, aromatic, heteroaromatic, branched, unbranched, substituted, and unsubstituted alcohols, alkoxylated products of alkyl alcohols, alkyl ester alcohols and mixtures thereof. Examples of suitable monofunctional aliphatic alcohols include ambutyl alcohol, isobutyl alcohol, isohexyl alcohol, 1,3'-dimethylbutyl alcohol, hexyl alcohol, heptyl alcohol, octyl alcohol, decyl alcohol, nonyl alcohol, 2-ethylhexyl alcohol, 2-ethyl-1-heptyl alcohol, 2-ethyl-1-octyl alcohol, isooctyl alcohol, oxo alcohol, dodecyl alcohol, undecyl alcohol, tridecyl alcohol, isotridecyl alcohol, tetradecyl alcohol, pentadecyl alcohol, hexadecyl alcohol, isohexyldecyl alcohol, 3,5,5-trimethyl-1-hexyl alcohol, styro alcohol, and behenyl alcohol, alcohols having from 12 to 30 carbon atoms (e.g., oleyl alcohol), alcohol mixtures that are obtained by hydrogenating fatty acid mixtures of from 12 to 30 carbon atoms obtained from natural fats and oils, such as olive oil, grapeseed oil, coconut oil, palm oil, soybean oil, cottonseed oil, and linseed oil, alkyl ester alcohols (e.g., 2,2,4-trimethyl-1,3-pentanediol monoisobutyrate), and combinations thereof. Useful monofunctional alcohols and methods of endcapping monofunctional alcohols for use with prepolymers are also described, e.g., in U.S. Pat. No. 6,498,210 and incorporated herein.

Useful commercially available monofunctional alcohols include the methoxypolyethylene glycols that are commercially available under the CARBOWAX series of trade designations including, e.g., CARBOWAX PMEG 350, 500 and 750, from Dow Chemical Company (Midland, Mich.), and ALFOL C 14 1-tetradecanol and ALFOL C18 1-octadecanol both of which are available from Condea Vista Company, Houston, Tex.).

When preparing the moisture curable, radiation curable polyurethane prepolymer, if a monofunctional alcohol is present, the monofunctional alcohol is preferably present in the reaction mixture in an amount of less than about 10 molar %, more preferably less than about 5 molar %, based on the molar equivalents of isocyanate.

For sealant compositions that include a moisture curable, radiation curable prepolymer, the prepolymer is preferably present in an amount of from 20% by weight to 100% by weight, more preferably from about 30% by weight to about 60% by weight.

Blend of Moisture Curable Polymer and Radiation Curable Polymer Moisture Curable Polymer For the sealant composition that includes a blend of a moisture curable polyurethane prepolymer and a radiation curable polymer, the moisture curable polyurethane prepolymer can be an above-described moisture curable polyurethane prepolymer where the functional groups include isocyanate groups, silane groups or a combination thereof. Preferred moisture curable polyurethane prepolymers are endcapped with silane functional groups and or isocyanate. The polyurethane prepolymer preferably has a number average molecular weight of from about 1500 to about 20,000 g/mole. Methods of making isocyanate functional polyurethane prepolymers, silane functional prepolymers, and prepolymers that include isocyanato functionality and silane functional set forth above are incorporated herein.

Preferred isocyanate functional polyurethane prepolymers are described in U.S. Pat. No. 6,355,317, incorporated herein by reference. Preferred silane functional polyurethane prepolymers as above described are end-capped with at least one silane functional group, and preferably include no greater than six silane functional groups. Most preferably, the moisture curable silane prepolymer has less than about 25% molar equivalents, most preferably less than about 20% molar equivalents, of silane groups based on the molar equivalents of the prepolymer. More preferably, it also includes less than about 15% molar equivalents of monofunctional alcohol, more preferably less than about 10% molar equivalents of monofunctional alcohol.

Otherwise useful silane capped polyurethanes are the PERMAPOL urethanes described in U.S. Pat. No. 4,960,844, and the silylated polyurethane compositions described in U.S. Pat. No. 6,498,210, incorporated herein by reference.

When preparing the moisture curable polyurethane prepolymer, monofunctional alcohol is preferably present in the reaction mixture in an amount of less than about 55 molar %, more preferably less than about 50 molar %, most preferably less than about 45 molar % based on the molar equivalents of isocyanate.

The moisture curable polyurethane prepolymer is preferably present in the composition in an amount from about 1% by weight to about 40% by weight, more preferably from about 1% to about 20% by weight, and most preferably from about 3% by weight to about 10% by weight Radiation Curable Polymer The radiation curable polymer is a (meth)acrylate polymer having a functionality of at least two. Examples of useful (meth)acrylate polymers include polybutadiene diacrylate, polybutadiene urethane diacrylate, mono-functional and multi-functional acrylates (i.e., acrylates and methacrylates), acrylated polyesters, acrylated aromatic urethanes, acrylated aliphatic urethanes, acrylated acrylics, and combinations or blends thereof.

Examples of suitable acrylated oligomers include acrylated polyesters, acrylated aromatic urethanes, aliphatic urethanes, vinyl acrylates, acrylated oils, and acrylated acrylics. Examples of acrylated aliphatic urethanes include those available under the trade designations PHOTOMER 6010 (MW=1500) from Henkel Corp. (Hoboken, N.J.), EBECRYL 8401 (MW=1000) and EBECRYL 8402 (MW=1000, urethane diacrylate) from UCB Radcure Inc. (Smyrna, Ga.), CN 9635, CN9645, and CN 9655, from Atofina Chemicals (West Chester, Pa.).

Preferred acrylates are hydrophobic, predominantly of hydrocarbon structure, have a low Tg (preferably less than about 0° C., more preferably less than about −10° C.) and have sufficient compatibility with the moisture curable prepolymer. Preferred acrylated polymers are also substantially amorphous. Such acrylates are commercially available under the trade designations BAC-45 from San Esters Corporation, a distributor of Osaka Organic Chemicals (Osaka, Japan), and CN302 from Atofina Chemicals (Exton, Pa.).

The radiation curable polymer is preferably present in the composition in an amount of greater than about 5% by weight, more preferably greater than about 15% by weight, most preferably greater than about 20% by weight.

Photoinitiators

The composition can optionally include photoinitiator. Preferred photoinitiators are capable of promoting free radical polymerization, crosslinking, or both, of the ethylenically unsaturated moiety on exposure to radiation of a suitable wavelength and intensity. The photoinitiator can be used alone, or in combination with a suitable donor compound or a suitable coinitiator. The photoinitiator and the amount thereof are preferably selected to achieve a uniform reaction conversion, as a function of the thickness of the composition being cured, as well as a sufficiently high degree of total conversion so as to achieve the desired initial handling strength (i.e., green strength).

Useful photoinitiators include, e.g., "alpha cleavage type" photoinitiators including, e.g., benzyl dimethyl ketal, benzoin ethers, hydroxy alkyl phenyl ketones, benzoyl cyclohexanol, dialkoxy acetophenones, 1-hydroxycyclohexyl phenyl ketone, trimethylbenzoyl phosphine oxides, methyl thio phenyl morpholino ketones and morpholino phenyl amino ketones; hydrogen abstracting photoinitiators, which include a photoinitiator and a coinitiator, based on benzophenones, thioxanthones, benzyls, camphorquinones, and ketocoumarins; and combinations thereof. Preferred photoinitiators include acylphosphine oxides including, e.g., bis (2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide.

Useful commercially available photoinitiators are available under the following trade designations IRGACURE 369 morpholino phenyl amino ketone, IRGACURE 819 bis(2,4,6-trimethylbenzoyl)-phenylphosphine oxide and its preferred form CGI819XF, IRGACURE CGI 403 bis(2,6-dimethoxybenzoyl)-(2,4,4-trimethylpentyl) phosphine oxide, IRGACURE 651 benzyl dimethyl ketal, IRGACURE 184 benzoyl cyclohexanol, DAROCUR 1173 hydroxy alkyl phenyl ketones, DAROCUR 4265 50:50 blend of 2-hydroxy-2-methyl-1-phenylpropan-1-one and 2,4,6-trimethylbenzoyldiphenylphosphine oxide, and CGI1700 25:75 blend of bis(2,6-dimethoxybenzoyl)-2,4,4-trimethylpentylphosphine and 2-hydroxy-2-methyl-1-phenylpropan-1-one, all of which are available from Ciba-Geigy Corp. (Ardsley, N.Y.)

The photoinitiator is preferably present in an amount sufficient to provide the desired rate of photopolymerization. The amount will depend, in part, on the light source, the thickness of the layer to be exposed to radiant energy and the extinction coefficient of the photoinitiator at the wavelength. Typically, the photoinitiator component will be present in an amount of from about 0.01% by weight to about 5% by weight, more preferably from about 0.01% by weight to about 1% by weight. Preferred photoinitiators include acylphosphine oxides, which are preferably present in an amount of from about 0.03% by weight to about 0.4% by weight.

Catalyst

The composition can also include a catalyst to facilitate the reaction between the polyol and polyisocyanate, hydrolysis, and/or the subsequent crosslinking reaction of the silane groups, isocyanate groups, or a combination thereof. Useful catalysts include, e.g., tertiary amines including, e.g., N,N-dimethylaminoethanol, N,N-dimethylcyclohexamine-bis(2-dimethyl aminoethyl)ether, N-ethylmorpholine, N,N,N',N',N''-pentamethyl-diethylene-triamine, and 1-2(hydroxypropyl) imidazole, and metal catalysts including, e.g., tin (e.g., dialkyl tin dicarboxylates, e.g., dibutyl tin dilaurate and dibutyl tin diacetate, tertiary amines, stannous salts of carboxylic acids, e.g., stannous octoate and stannous acetate, tetrabutyl dioleatodistannoxane), titanium compounds, tin carboxylates, organosilicon titantates, alkyltitantates, and combinations thereof.

For moisture curable, radiation curable sealant compositions, the catalyst is preferably present in an amount of from about 0.01% by weight to about 2% by weight.

Filler

The composition can optionally include fillers. The chemical composition of the filler, and its particle size and morphology, particle size distribution, and the surface treatment of the filler are preferably selected to minimize the absorption of the incident UV light on the composition. (See "Shadow Curing of UV Adhesives", George W. Ritter, Proceedings of the 24$^{th}$ Annual Meeting of the Adhesion Society, pg. 83, Feburary 2001.

Suitable fillers include, e.g., fumed silica (e.g., AEROSIL R202 and AEROSIL R812S, from Degussa, N.J.), synthetic amorphous silicon dioxide treated with an organic wax (e.g., GASIL UV 70C, from Crosfield Company, Ill.), talc (e.g., MISTRON VAPOR R and MISTRON CB from Luzenac American, CO), calcium carbonate, such as ground calcium carbonate (e.g., Hi-PLFEX 100 GCC, Vicron) and precipitated calcium carbonate (PCC) (e.g., ULTRAPFLEX PCC, THIXO-CARB from Specialty Minerals Inc.), alumina trihydrate (ATH), magnesium carbonate, calcium sulfate, barium sulfate, magnesium hydroxide, clay, mica, titanium dioxide, and combinations thereof. Preferred fillers have an aspect ratio 1–4 (e.g., spherical or cubic). The average particle size of the filler is preferably from about 0.15 to about 25 microns, more preferably from about 1 to about 15 microns.

Examples of preferred fillers include treated calcium carbonates having particles sizes as described above, which are available as, for example, Hi-PLFEX from Specialty Minerals, WINNOFil from Zeneca Resins, and HUBER-CARB from Huber. Other preferred fillers include rheological additives that provide thixotropy, such as the ULTRAPFLEX PCC described above, and pigments, such as titanium oxide. Other preferred fillers include reflective particles, such as silver coated mica, for example, CONDUCT-O-FIL from Potters Industries Inc., PA; and magnesium oxide, for example, MAGLITE A and MAGLITE D from C. P. Hall Company.

Preferably the filler is present in the composition in an amount of at least 10% by weight, more preferably at least about 20% by weight, even more preferably from about 20% by weight to about 60% by weight, most preferably from about 30% by weight to about 50% by weight.

Plasticizer

Optionally the composition also includes a non-reactive plasticizer. Suitable plasticizers include, e.g., phthalates, adipates, phosphates, trimellitates, dipropylene and diethylene glycol dibenzoates and mixtures thereof, and epoxidized soybean oil. Suitable commercially available plasticizers include the Jayflex plasticizers from Exxon Chemical, the DIOCTYL, SANTICIZER, and DIBUTYL plasticizers from Monsanto, and the ADIMOLL, DISFLAMOLL, MESAMOLL, UNIMOLL, TEGDA, TRIACETIN, and ULTRAMOLL plasticizers from Bayer. Preferred plasticizers have low volatility, such as long chain, branched phthalates (e.g., ditridecyl phthalate, di-L-nonyl phthalate, and di-L-undecyl phthalate), including the JAYFLEX DTDP and DIDP plasticizers. Useful dioctyl and diisodecyl phthalates include those available under the tradenames "Jayflex DOP" and "Jayflex DIDP" from Exxon Chemical. Useful dibenzoates are available under the trade designations BENZOFLEX 9–88, BENZOFLEX 50 and BENZOFLEX 400 from Velsicol Chemical Corporation. Soybean oil is commercially available, e.g., from Union Carbide Corporation under the trade designation FLEXOL EPO and polymeric plasticizers from Bayer under the tradenames ULTRAMOLL.

Preferably the plasticizer is present in the composition in an amount of from about 5% by weight to about 30% by weight, more preferably less than about 25% by weight, more preferably no greater than about 20% by weight, most preferably from about 5% by weight to about 20% by weight.

Reactive Plasticizer

The composition can also optionally include a reactive plasticizer, i.e., a plasticizer that includes at least one functional group capable of reacting with the moisture reactive component of the moisture curable, radiation curable polyurethane prepolymer, or the moisture curable polyurethane prepolymer, or a combination thereof. The term "reactive plasticizer" encompasses plasticizer that becomes reactive with the moisture reactive groups of the polyurethane prepolymer or with itself upon exposure to moisture. Such reactive plasticizers include plasticizers that bear an active hydrogen group upon exposure to moisture. The reactive plasticizer preferably is selected to have functional groups similar to the functional group(s) of the polyurethane prepolymer, functional groups that will become reactive with the polyurethane prepolymer or the plasticizer, itself, after the composition is applied to a substrate or during its intended use, (e.g., upon exposure to ambient atmosphere, e.g., air, moisture or a combination thereof), or a combination of such functional groups. The reactive plasticizer is preferably selected to polymerize or crosslink the polyurethane prepolymer upon exposure to ambient conditions, e.g., moisture, air or a combination thereof. The reactive plasticizer can include any suitable reactive group including, e.g., alkoxy, isocyanate, aldimine, ketomine, bisoxazolidones, and combinations thereof.

Examples of useful reactive plasticizers capable of reacting with silane functional polyurethane prepolymers include plasticizers having alkoxysilyl reactive groups including, e.g., methoxysilyl, ethoxysilyl, propoxysilyl, and butoxysilyl, and acyloxysilyl reactive groups including, e.g., silyl esters of various acids including, e.g., acetic acid, 2-ethylhexanoic acid, palmitic acid, stearic acid, and oleic acid, and combinations thereof. Suitable reactive plasticizers also include polymers endcapped with the above-described alkoxysilyl groups. Such polymers include, e.g., polyalkylene oxides (e.g., polypropylene oxides), polyether-sulfideurethanes (e.g., low molecular weight PERMAPOL urethanes from PRC and as disclosed, e.g., in U.S. Pat. No. 4,960,844), polyisoalkylene oxides (e.g., polyisobutylene oxide), polyglycols, polyisobutylene, and combinations thereof.

Useful reactive plasticizers capable of reacting with isocyanate functional polyurethane prepolymers include, e.g., aldimines, ketimines, oxazolidines (e.g., bisoxazolidines, 1-(hydroxyethyl)-2-isopropyl-1,3-oxazolidine and 2-isopropyl-1,3-oxazolidine), dioxolanes (e.g., 2,2-dimethyl-1,3-dioxolane, 2,2-dimethyl-4-hydroxymethyle-1,3-dioxolane), and combinations thereof.

The reactive plasticizer preferably has a molecular weight of from about 300 g/mol to about 10,000 g/mol, more preferably from about 500 g/mol to about 6000 g/mol.

The reactive plasticizer is present in the composition in an amount of no greater than about 20% by weight, preferably from about 2% by weight to about 15% by weight, more preferably from about 3% by weight to about 10% by weight.

Thermoplastic Polymer

The composition can optionally include a thermoplastic polymer. Useful thermoplastic polymers are compatible with the sealant composition and include thermoplastic elastomers. Examples of useful thermoplastic polymers include polyalkylenes (e.g., polyethylene, polypropylene and polybutylene), poly(alpha)olefins including, e.g., homo-, co- and terpolymers of aliphatic mono-1-olefins (alpha olefins) (e.g., poly(alpha)olefins containing from 2 to 10 carbon atoms), homogeneous linear or substantially linear interpolymers of ethylene having at least one $C_3$ to $C_{20}$ alphaolefin, polyisobutylenes, poly(alkylene oxides), poly(phenylenediamine terephthalamide), polyesters (e.g., polyethylene terephthalate), polyacrylates, polymethacrylates, polyacrylamides, polyacrylonitriles, copolymers of acrylonitrile and monomers including, e.g., butadiene, styrene, polymethyl pentene, and polyphenylene sulfide (e.g., styrene-acrylonitrile, acrylonitrile-butadiene-styrene, acrylonitrile-styrene-butadiene rubbers), polyimides, polyamides, copolymers of vinyl alcohol and ethylenically unsaturated monomers, polyvinyl acetate (e.g., ethylene vinyl acetate), polyvinyl alcohol, vinyl chloride homopolymers and copolymers (e.g., polyvinyl chloride), terpolymers of ethylene, carbon monoxide and acrylic acid ester or vinyl monomer, polyurethanes, polystyrene, and combinations thereof, and homopolymers, copolymers and terpolymers thereof, and mixtures thereof. Other useful classes of thermoplastic polymers include asphalts, bitumens, crude rubbers, fluorinated rubbers, and cellulosic resins.

Preferred thermoplastic polymers include ethylene vinyl acetate having a vinyl acetate content of from about 10% by weight to about 60% by weight and a melt index of from about 0.2 to 1000, more preferably a vinyl acetate content of from about 18% by weight to about 50% by weight and a melt index of from about 0.2 to 500.

Useful commercially available thermoplastic polymers include, e.g., atactic polypropylene copolymers available under the REXTAC series of trade designations including, e.g., REXTAC RT 2535 and RT 2585, from Rexene Products Co. (Dallas, Tex.) and the EASTOFLEX series of trade designations including, e.g., EASTOFLEX E1060, from Eastman Chemical Co. (Kingsport, Tenn.); ethylene vinyl acetate copolymers available under the ELVAX series of trade designations from DuPont de Nemours (Wilmington, Del.) and the ULTRATHENE series of trade designations from Millennium Petrochemicals (Rolling Meadows, Ill.); ethylene methyl acrylate copolymers available under the OPTEMA series of trade designations from Exxon Chemical Co. (Houston, Tex.); ethylene n-butyl acrylate copolymers available under the LOTRYL series of trade designations from Elf Atochem North America (Philadelphia, Pa.), the ESCORENE series of trade designations from Exxon Chemical Co. and the ENATHENE series of trade designations from Millennium Petrochemicals; ethylene n-butyl acrylate carbon monoxide terpolymers available under the ELVALOY series of trade designations from DuPont; thermoplastic polyurethane polymers available under the PEARLSTICK series of trade designations from Aries Technologies (Derry, N.H., a distributor for Merquinsa, Barcelona, Spain); butylene/poly(alkylene ether) phthalate polymers available under the HYTREL series of trade designations from DuPont; ethylene acrylate copolymers also available under the ELVALOY series of trade designations from DuPont; and acrylic polymers available under the ELVACITE series of trade designations from ICI Acrylics (St. Louis, Mo.).

The thermoplastic polymer is present in the composition in an amount of from about 0% by weight to about 15% by weight, preferably from about 0% by weight to about 10% by weight.

Tackifying Agent

The composition can optionally include tackifying agent. Preferred tackifying agents have a ring and ball softening point of from about 70° C. to about 120° C., more preferably from about 80° C. to about 100° C. Examples of suitable tackifying agents include aliphatic, cycloaliphatic, aromatic, aliphatic-aromatic, aromatic modified alicyclic, and alicyclic hydrocarbon resins and modified versions and hydrogenated derivatives thereof; terpenes (polyterpenes), modified terpenes (e.g., phenolic modified terpene resins), hydrogenated derivatives thereof and mixtures thereof; natural and modified rosins such as gum rosin, wood rosin, tall oil rosin, distilled rosin, hydrogenated rosin, dimerized rosin and polymerized rosin; rosin esters including, e.g., glycerol and pentaerythritol esters of natural and modified rosins (e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin); alpha methyl styrene resins and hydrogenated derivatives thereof; low molecular weight polylactic acid; and combinations thereof. Other useful tackifying agents are disclosed in, e.g., U.S. Pat. No. 6,355,317, and incorporated herein.

Suitable commercially available tackifying agents include, e.g., partially hydrogenated cycloaliphatic petroleum hydrocarbon resins available under the EASTOTAC series of trade designations including, e.g., EASTOTAC H-100, H-115, H-130 and H-142 from Eastman Chemical Co. (Kingsport, Tenn.) available in grades E, R, L and W, which have differing levels of hydrogenation from least hydrogenated (E) to most hydrogenated (W), the ESCOREZ series of trade designations including, e.g., ESCOREZ 5300 and ESCOREZ 5400 from Exxon Chemical Co. (Houston, Tex.), and the HERCOLITE 2100 trade designation from Hercules (Wilmington, Del.); partially hydrogenated aromatic modified petroleum hydrocarbon resins available under the ESCOREZ 5600 trade designation from Exxon Chemical Co.; aliphatic-aromatic petroleum hydrocarbon resins available under the WINGTACK EXTRA trade designation from Goodyear Chemical Co. (Akron, Ohio); styrenated terpene resins made from d-limonene available under the ZONATAC 105 LITE trade designation from Arizona Chemical Co. (Panama City, Fla.); aromatic hydrogenated hydrocarbon resins available under the REGAL-REZ 1094 trade designation from Hercules; and alphamethyl styrene resins available under the trade designations KRISTALEX 3070, 3085 and 3100, which have softening points of 70° C., 85° C. and 100° C., respectively, from Hercules.

For those sealant compositions that include ethylene vinyl acetate, the tackifying agent is preferably selected based upon the vinyl acetate content of the ethylene vinyl acetate copolymer. For ethylene vinyl acetate copolymers having a vinyl acetate content of at least 28% by weight, the tackifying agent is preferably an aromatic or aliphatic-aromatic resin having a ring and ball softening point of from 70° C. to about 120° C. For vinyl acetate copolymers having a vinyl acetate content less than 28% by weight, the tackifying agent is preferably aliphatic or aliphatic-aromatic resin having a ring and ball softening point of from 70° C. to about 120° C.

The tackifying agent is present in the composition in an amount of from about 0% by weight to about 10% by weight, preferably from about 0% by weight to about 5% by weight.

Organofunctional Silane Adhesion Promoters

The composition can also optionally include organofunctional silane adhesion promoters. Preferred organofunctional silane adhesion promoters include silyl groups such as alkoxysilyls, aryloxysilyls, and combinations thereof. Examples of useful alkoxysilyl groups include methoxysilyl, ethoxysilyl, propoxysilyl, butoxysilyl, and acyloxysilyl reactive groups including, e.g., silyl ester of various acids including, e.g., acetic acid, 2-ethylhexanoic acid, palmitic acid, stearic acid, and oleic acid.

Suitable organofunctional silane adhesion promoters include, e.g., epoxy glycidoxy propyl trimethoxy silane, octyltriethoxysilane, methyltrimethoxysilane, beta-(3,4-epoxy cyclohexyl)ethyl trimethoxy silane, methacryloxypropyl trimethoxy silane, alkyloxyiminosilyls, vinyl trimethoxy silane, vinyl triethoxy silane, vinyl methyl dimethoxy silane, amino propyl trimethoxy silane, amino propyl triethoxy silane, N-phenyl amino propyl trimethoxy silane, bis-(trimethoxy silyl propyl)amine, N-beta-(aminoethyl)-amino propyl trimethoxy silane, N-beta-(aminoethyl)-amino propyl trimethoxy silane, N-beta-(aminoethyl-amino propyl-methyl dimethoxy silane, ureido propyl trimethoxy silane, tris[3-(trimethoxysilyl)propyl]isocyanurate, 4-amino-3,3-dimethylbutyldimethoxymethylsilane, and ethoxy and methoxy/ethoxy versions thereof, and mixtures thereof.

Suitable commercially available adhesion promoters include, e.g. silane adhesion promoters available under the trade designations SILQUEST Y-11597 and SILQUEST A-187, A-174, A-186, A-171, A-172, A-2171, A-137, and A-162, all of which are available from Witco Corporation, OSi Specialties-Crompton Corp., and VPS 1146 and DAMO 1411, both of which are available from Degussa Corporation (Naperville, Ill.).

The adhesion promoter, when present in the composition, is preferably present in an amount of from about 0.1% by weight to about 5% by weight, and more preferably from about 0.1% to about 3% by weight.

Other Components

The compositions can also include other additives including, e.g., reflective particles, non reactive resins, ultraviolet light stabilizers, antioxidants, catalysts, rheology modifiers, biocides, corrosion inhibitors, dehydrators, organic solvents, colorants (e.g., pigments and dyes), surfactants, flame retardants, waxes, and mixtures thereof. These components, when present, are preferably selected to have limited UV absorption to maximize the amount of light transmitted through the material and available for the photoinitiator molecules to initiate the photopolymerization process. UV absorbers (UVA) and/or hindered amine light stablilizers (HALS) may also help improve weathering characteristics of the compositions. Examples of UVA and HALS include, e.g., TINUVIN P, and TINUVIN 327, 328, 384, 900, 928, 1130, 400, 123, 144 and 292, from Ciba-Geigy Corp. Examples of preferred materials are hydroxyphenyl-s-triazines (HPT), e.g., TINUVIN 400.

The sealant composition can be cured using radiation including, e.g., electron beam, ultraviolet light (i.e., radiation in the range from about 200 nm to about 400 nm), visible light (radiation having a wavelength in the range of from about 400 nm to about 800 nm) and combinations thereof. Useful sources of radiation include, e.g., extra high pressure mercury lamps, high pressure mercury lamps, medium pressure mercury lamps, metal halide lamps, microwave powered lamps, xenon lamps, laser beam sources including, e.g., excimer lasers and argon-ion lasers, and combinations thereof.

The sealant composition is particularly useful for bonding glass to various substrates including other glass substrates, polymer substrates, metallic substrates, and combinations thereof, and providing a moisture barrier function in a variety of applications and constructions. The sealant composition is particularly useful in constructions including, e.g., insulating glass units, sash frame assemblies, back bedding, automotive and moulding applications, windows, doors, walls, and constructions that require good adhesion to glass, metal, plastic and combinations thereof.

In some embodiments, the sealant composition is used to bond at least one pane of glass to a structural support, e.g., a spacer in an insulating glass unit, one or more legs or surfaces of a spacer in an insulating sash assembly, the frame to which an insulating glass unit is bonded during a back bedding operation, and combinations thereof.

Insulating glass assemblies are available in a variety of configurations. Examples of integrated multipane window units, insulating glass units, and sash assemblies and methods of making them are described in U.S. Pat. Nos. 6,463,706, 6,401,428, 6,286,288, 6,055,783, 5,873,203, 5,653,073 and PCT Publication No. WO 99/14169 (Guhl et al.) and WO 98/25001 (France), and incorporated herein.

The sealant composition is suitable for use in manufacturing insulating glass assemblies. In the manufacturing process, the sealant composition is applied to a glazing surface, e.g., a surface on the spacer, the perimeter of the glass pane that is positioned over the spacer, or both. The sealant composition can be applied to the glazing surface using any suitable applicator including, e.g., a hand held glue gun, extruder, automated application equipment, e.g., a hand assist commercially available under the EACYPLY H1001 trade designation from Erdman Automation Corp. (Princeton, Minn.). Sealant composition can also be applied simultaneously either horizontally or vertically to different portions of the spacer or the glass pane using at least two applicators.

After the sealant is applied to the glazing surface, a glass pane is positioned against the sealant and the spacer. Pressure can be applied using a variety of pressure applicators including, e.g., a platen press, rollers, traversing rollers, pivoting roller wheels, roller transfer balls, and Teflon squares, and combinations thereof. The pressure applicators are dimensioned to provide a contact area sufficient to apply a sufficiently uniform force across the bond line.

Preferably the sealant is from 0.02 inch to 0.04 inch thick and from about 0.25 inch to 0.6 inch in width. Preferably the pressure exerted on the sealant is from about 1 psi to about 75 psi for a period of time sufficient to bond the glass pane to the spacer.

The composition is then exposed to radiation, e.g., electron beam, ultraviolet light, visible light or a combination thereof, to effect cure. One useful method of radiant curing involves irradiating the composition through the glass pane with radiant energy density of from 2000 mJ/cm$^2$ to 3500 mJ/cm$^2$ in the UV wavelength range from 320 nm to 390 nm (as measured with a Power-Puck radiometer from EIT, Inc., Sterling, Va.) using two Fusion Systems Curing Units equipped with Fusion V and D bulbs, the bulbs having a power supply of 240 W/cm. The articles can be transported through the manufacturing process on a conveyor. The conveyor speed can be varied to achieve an appropriate radiant energy density. In one embodiment, the articles are irradiated while being transported at a rate from 20 feet per minute (fpm) to 30 fpm.

Insulating glass assemblies usually include a spacer having at least two glazing surfaces, a sealant composition, and at least two panes of glass bonded to the spacer through the sealant composition to enclose a sealed air chamber. The assembly can include a desiccant positioned in the sealed chamber. The spacer can include a channel, e.g., a U-shaped channel, in which the desiccant is disposed. The spacer can be constructed such that it extends from the frame and is integral with the frame. In other embodiments, the spacer can be a separate structure that is used to form an insulating glass unit, which is then further processed by bonding the insulating glass unit to a sash frame. Examples of integrated multipane window units, insulating glass units, and sash assemblies are described in U.S. Pat. No. 5,177,916 (Misera et al.), U.S. Pat. No. 6,286,288 (France), U.S. Pat. Nos. 5,873,203, 5,653,073 (Palmer), U.S. Pat. No. 6,055,783 (Guhl et al.), and U.S. Pat. No. 6,401,428 (Glover et al.), and PCT Publication No. WO 99/14169 (Guhl et al.) and WO 98/25001 (France), and incorporated herein. The spacer can be of a variety of compositions including, e.g., wood, metal, plastic (e.g., polyvinyl chloride), composites (e.g., polymer and wood fiber composites) and combinations thereof.

An example of a useful method of making an insulating glass assembly is described in copending U.S. patent application Ser. No. 60/453,872, filed Mar. 11, 2003, and entitled, "Sealant Compositions For Forming Adhesive Bonds To Glass At Low Temperature," and incorporated herein.

The invention will now be described by way of the following examples.

EXAMPLES

Test Procedures

Test procedures used in the examples include the following.

Tensile Strength, Modulus at 100% Elongation and Elongation Test Method (1) A homogeneous film of the sealant composition is pressed at ambient temperature to a thickness of about 40 mils between polypropylene film that has a release coating on the side the composition is pressed toward. The compositions are then irradiated through the top polypropylene film with radiant energy density of 2000 to 3500 mJ/cm$^2$ in the UV wavelength range of 320 to 390 nm, measured with a Power-Puck radiometer from EIT, Inc., Sterling, Va., using two Fusion Systems Curing Units equipped with Fusion—V and D bulbs having a power supply of 240 W/cm. By varying the conveyor speed in which the specimens are placed to be irradiated from 20 fpm to 30 fpm, the radiant energy density can be adjusted. The tensile strength at break, modulus at 100% elongation and % elongation of a sealant composition is determined according to ASTM-638-00 entitled, "Standard Test Method for Tensile Properties of Plastics." The film is conditioned at 23° C. and 50% relative humidity for two weeks to moisture cure.

(2) Specimens are cut from the film and tested for tensile strength at 25%, 50% and 100% elongation, modulus at 100% elongation and elongation according to ASTM D638-00.

Lap Shear Strength

The lap-shear strength is determined according to ASTM D1002-01 Standard Test Method for Apparent Shear Strength of Single-Lap-Joint Adhesively Bonded Metal Specimens by Tension Loading (Metal-to-Metal). The test method is modified to test lap-shear bonds using rigid polyvinyl chloride PVC (1 inch (about 2.5 cm) width×3 inches (about 7.6 cm) length and glass (1 inch (about 2.5 cm)

width×3 inches (about 7.6 cm) length) as substrates. The thickness of the glass is 3/16 inches (about 4.8 mm) (standard thickness for ASTM E-773-97 for Accelerated weathering of sealed insulating glass units). The width of the lap-shear is 1 inch (about 2.5 cm) and the overlap is 1.0+/−0.05 inches (about 2.5 cm±1.3).

The specimens are prepared by dispensing a bead of the sealant compositions with a caulking-gun to the end of the PVC substrate to cover a 1 inch×1 inch (about 2.5 cm×2.5 cm) square area. Placing two strips of Ni wire of a 20 mil (0.5 mm) diameter, on the sealant bead. Placing the glass substrate aligned directly above the glass to form a 1 inch×1 inch (about 2.5 cm×2.5 cm) overlap. The assembly is then pressed to a sealant thickness of approximately 20 mils (0.5 mm), and irradiated through the glass with radiant energy density of 2000 to 3500 mJ/cm$^2$ in the UV wavelength range of 320 to 390 nm, measured with a Power-Puck radiometer from EIT, Inc., Sterling, Va., using two Fusion Systems Curing Units equipped with Fusion—V and D bulbs having a power supply of 240 W/cm. By varying the conveyor speed in which the specimens are placed to be irradiated from 20 fpm to 30 fpm, the radiant energy density can be adjusted.

The bond specimens are conditioned at 23° C. and 50% relative humidity for the periods indicated in the tables.

Initial lap-shear strength (i.e., green-strength) is determined within about one to two hours after preparing the bond sample.

Initial lap-shear strength (i.e., green-strength) at 43.3° C. (110° F.) is determined at that temperature by conditioning the samples for about one hour at that temperature within about one after preparing the bond sample.

Moisture Vapor Transmission Rate (MVTR)

The permeability coefficient (MVTR) is determined according to ASTM F1249-90 entitled, "Standard Test Method for Water Vapor Transmission Rate Though Plastic Film and Sheeting using a Modulated Infrared Sensor." The test is conducted at approximately 37° C. (100° F.) and 90% relative humidity on a sample in the form of a film having a specified thickness.

Dead Load at 60° C. (140° F.)

Samples prepared according to the lap shear method are conditioned for at least two weeks at 23° C. and 50% relative humidity. A one pound weight is suspended from the lap shear bond of the sample while the sample is exposed to 60° C. (140° F.) for one week. The static load resistance (i.e., dead load) of lap-shear bonds to polyvinyl chloride and glass is measured. If the one pound weight remains suspended, a sample is recorded as a "pass." If the one pound weight falls from the sample prior to the end of the one week period, the time at failure is recorded and the sample is recorded as a "fail."

Viscosity

Viscosity is measured using a Brookfield Thermosel Viscometer optionally attached to a chart recorder. The spindle and rotations per minute are set in accordance with the manufacturer's operating instructions to obtain accurate results.

Molecular Weight by Gel Permeation Chromatography

The molecular weight of the prepolymer is determined by gel permeation chromatography (GPC) by dissolving the prepolymer in tetrahydrofuran and injecting the solution into a GPC and calculating the molecular weight relative to a polystyrene standard. Polydispersity index is measured by GPC, as GPC weight average molecular weight/GPC number average molecular weight.

Rheology

Press flow

A press flow extrusion rheometer is used to measured the sealant flow in grams/min. The diameter of the is 0.104±0.002. inch (about 2.6±0.05 mm). The pressure is indicated in the tables.

Glass Transition Temperature (Tg)

The glass transition temperature (Tg) of uncured sealant composition is determined according to ASTM D-3418-83 entitled, "Standard Test Method for Transition Temperatures of Polymers by Differential Scanning Calorimetry (DSC)" by conditioning a sample at 60° C. for two minutes, quench cooling the sample to −60° C., and then heating the sample to 60° C. at a rate of 20° C. per minute. The reported Tg is the temperature at which onset of the phase change occurs.

For cured compositions Tg is measured as the peak temperature of the Tand curve obtained by DMA.

Dynamic Mechanical Analysis Testing

Plots of elastic and loss moduli over a range of temperatures from 60° C. to −40° C. at 10 rad/sec were obtained according to ASTM D4065-01 Standard Practice for Plastics: Dynamic Mechanical Properties: Determination and Report of Procedures.

Hardness

The hardness of the sealant composition is measured using a Shore A durometer according to ASTM D-2240.

Conditioning

Wet UV Conditioning

A sample, e.g., the lap shear bond construction in the case of lap shear testing, is placed in a chamber and continuously exposed to ultraviolet light (UV-A) and 100% humidity at 35° C. (95° F.) for a specified period.

−40° C./71.1° C. (−40° F./160° F.) Temperature Cycling

A sample, e.g., the lap shear bond construction in the case of lap shear testing, is placed in a Cincinnati Sub Zero Chamber Model No. U-15-X-X25. The temperature in the chamber is cycled from −40° C. to 71.1° C. (−40° F. to 160° F.) four times every 24 hours.

100% Relative Humidity/60° C. (140° F.) Conditioning

A sample, e.g., the lap shear bond construction in the case of lap shear testing, is placed in a chamber in which the relative humidity is 100% and the temperature is 60° C. (140° F.) for a specified period.

Polyurethane Prepolymer Preparation

Moisture Curable, Radiation Curable Prepolymer 1 (PP 1)

An acrylate-silane-terminated polyurethane prepolymer is prepared as follows. A reaction vessel equipped with a mechanical stirrer, a thermometer, a condenser, a dry nitrogen inlet, and a dry air, inlet is heated to from 60° C. to 70° C. and placed under vacuum. Into the reaction vessel is placed, with agitation, PRIPLAST 3187 dimer acid-based polyester diol (Uniqema), 10.6 g of JAYFLEX DTDP (Exxon Mobil Chemicals) plasticizer, and 0.1 g of IRGA-NOX 1010 (CIBA Specialty Chemicals) antioxidant. The mixture is mixed under vacuum for ninety minutes while maintaining the contents at about 70° C. to 75° C.

To the mixture in the reaction vessel is then added 13.3 g ISONATE 125M 4,4'-diphenylmethane diisocyanate (Dow Chemical). The reaction vessel is maintained at 75° C. under vacuum for ninety minutes or until the percent isocyanate content is 1.6%+/−0.3%, as measured according to ASTM D-2572-80. The temperature of the reaction vessel is then lowered to 70° C. and 3.7 g of 2-HEA, 2-hydroxyethylacrylate (Dow Chemicals) is slowly added to the mixture, under a stream of dry air. The reaction is then maintained at 70° C. for about 45 minutes, under a partial vacuum of 20 inches, to an isocyanate concentration of less than 0.2%, as measured according to ASTM D-2572-80. The temperature of the reaction vessel is then lowered to about 50° C.–55° C. and 0.6 g SILQUEST ALINK 15 N-ethyl-3-trimethoxysilyl-2-methyl propanamine (OSi Specialties-Crompton Corp.) is added to the mixture, which is then maintained at about 50° C.–60° C. for 35 minutes to a final isocyanate concentration of less than 0.1%. Then 0.02 g of MEHQ, hydroquinone monomethylether, (Aldrich Chemical Corp.) is added in 5 g of JAYFLEX DTDP to facilitate the dispersion. The mixture is then mixed for an additional minute, discharged and stored under a blanket of dry air.

Moisture Curable, Radiation Curable Prepolymers 2-5 (PP 2–5)

Prepolymers 2–5 are prepared according to the method used to prepare Prepolymer 1, with the exception that the components and amounts thereof are as specified in Table 1.

Crompton Corp.). The mixture is stirred under full vacuum at 90° C. for 1 hour until it achieves a pasty consistency. The temperature is then lowered to about 40–50° C., and purged with dry air during the addition of 43.9 g of Prepolymer 1 and 0.18 g of SILQUEST A-171. The mixture is stirred under partial vacuum of 20 in. (about 50.8 cm) for 1 hour at about 40–50° C. The vessel is then placed under dry air and the remaining ingredients are added: 0.17 g of A-171, 0.5 g of SILQUEST A-187 adhesion promoter, 0.1 g of CGI 819XF photoinitiator (CIBA Chemicals, Terrytown N.J.), and 0.02 g of METATIN 740 catalyst (Acima Chemical Industries Limited, Inc., Switzerland). Heating is turned off and all the components are thoroughly mixed under dry air for 15 minutes. The sealant is deaereated by applying vacuum for five minutes, discharged and packaged.

Examples 2–5

Sealant compositions of Examples 2–5 are prepared according to the method used to prepare the sealant composition of Example 1, with the exception that the compo-

TABLE 1

|  | PP 1 | PP 2 | PP 3 | PP 4 | PP 5 | PP 6 | PP 7 |
| --- | --- | --- | --- | --- | --- | --- | --- |
| Components wt % | | | | | | | |
| Priplast 3187 | 71.8 | 72.4 | 74 | | | 69.6 | 81 |
| Priplast 3190 | | | | | 42.3 | | |
| Poly bd R45 HT Lo | | | | 33.7 | | | |
| Arcol R-2731 | | | | 26.9 | 20.9 | | |
| Alfol 12, 14 | | | | 8.1 | 3.0 | | |
| 2-HEA | 3.7 | 3.8 | 5 | | 5.3 | 4.9 | 3.5 |
| Mondur ML | | | | | | | 14.3 |
| Isonate 125M | 13.3 | 13.3 | 16.5 | 20.3 | 20.9 | 14.5 | |
| Silquest Alink 15 | 0.6 | 0 | 4.3 | 10.7 | 7.5 | 0.6 | 1.0 |
| Jayflex | 10.6 | 10.1 | | | | 10.2 | |
| Irganox 1010 | 0.1 | 0.2 | | 0.1 | | 0.09 | 0.1 |
| Irganox 3052 | | | | | 0.1 | | |
| MEHQ | 0.02 | 0.02 | | | | 0.01 | 0.02 |
| NCO/OH polyol | 1.5 | 1.5 | 1.8 | 5.6 | 4.2 | 1.7 | 1.4 |
| % Molar Equivalents of mono-alcohol | 0 | 0 | 0 | 13 | 5 | 0 | 0 |
| % Molar Equivalents endcapped with acrylate | 15 | 15 | 16 | 13 | 23 | 19 | 13 |
| % Molar Equivalents endcapped with A15 | 1 | 0 | 8 | 15 | 10 | 1 | 2 |
| Number Average Molecular Weight (Mn) | 10,800 | 8,600 | 3,500 | 1,870 | 2,000 | 8,000 | 10,000 |
| Polydispersity Index | 1.95 | 2.4 | 6.0 | 6.3 | 3.5 | 2.2 | 3.2 |
| Viscosity @ 60 C (cps) | 103,750 | 135,500 | 105,000 | | | 24,000 | ND |
| Elongation % 20 mils cured films | ND | ND | 110 | 93 | 67 | ND | ND |

[1]POLY BD 45 HTLo hydroxyl terminated polybutadiene (Atofina Chemicals, Inc., Exton, Pennsylvania)
[2]Alfol 12, 14 (Condea Vista Company, Houston, Texas)
ND = not determined Sealant Preparation Sealant Composition Comprising a Moisture Curable, Radiation Curable PP Example 1

Filler is pre-dried in an air-ventilated oven at 110° C. for 14 hours. The above-described Prepolymer 1 (PP 1) is preheated to about 50° C.–60° C. for from 1 to 2 hours. Into a planetary mixer equipped with heated-jacket mixing vessel, a thermometer, a condenser and a dry air inlet, is added 42.1 g of HIPFLEX 100, 1.5 g of ULTRAPFLEX, fillers, 11.2 g of JAYFLEX DTDP, plasticizer, and 0.35 g of SILQUEST A-171, vinyltrimethoxysilane (OSi Specialtiesnents and amounts thereof are as specified in Table 2. The sealant compositions of Examples 1–5 are tested according to the above-described test methods. The results are reported in Table 3.

TABLE 2

| | Example | | | | |
| --- | --- | --- | --- | --- | --- |
|  | 1 | 2 | 3 | 4 | 5 |
| Prepolymer 1 | 43.9 | | 39 | | |
| Prepolymer 2 | | 44.75 | | | |
| Prepolymer 6 | | | | 39 | |
| Prepolymer 7 | | | | | 39.4 |

TABLE 2-continued

| | Example | | | | |
|---|---|---|---|---|---|
| | 1 | 2 | 3 | 4 | 5 |
| Jayflex DTDP | 11.2 | 9.74 | 10 | 10 | 11.2 |
| Polybutene 32 (SOLTEX, Huston, TX) | | | 4 | 4 | |
| ATEVA 2850 | | | | | 5.9 |
| Escorez 5690 | | | | | 2.7 |
| HiPFlex 100 | 42.1 | 43.98 | 42 | 42 | |
| UltraPFlex | 1.5 | | | | |
| Maglite D (MgO, C.P. Hall) | | | 2 | 2 | |
| Silquest A-171 | 0.7 | 0.96 | 1 | 1 | 0.7 |
| Silquest A-187 | 0.5 | 0.48 | 1 | 1 | 0.5 |
| CGI 819 XF | 0.1 | 0.1 | 0.05 | 0.09 | 0.1 |
| Tinuvin 400 (CIBA) | | | 1 | 1 | |
| Dibutyltinlaureate T-12 | | 0.05 | | | |
| Metatin 740 | 0.02 | | 0.03 | 0.03 | 0.03 |
| Total | | | | | |

80. The temperature of the reaction vessel is then lowered to about 50° C.–55° C. and 6.32 g SILQUEST ALINK 15 N-ethyl-3-trimethoxysilyl-2-methyl propanamine (OSi Specialties-Crompton Corp.) is added to the mixture, which is then maintained at about 50° C.–60° C. for 45 minutes as measured according to ASTM D-2572-80 to a final isocyanate concentration of less than 0.1%. Then 6.32 g SILQUEST Y11639 1-butanamine-2,2-dimethyl-4-(dimethoxy methylsilyl) amino dimethoxysilane (OSi Specialties-Crompton Corp.) and 0.71 g DYNASYLAN 6490 vinyl trimethoxysilane (Degussa Corporation, Naperville, Ill.), are added with mixing under nitrogen and maintained at 50° C.–60° C. for 30 minutes.

Sealant Composition Comprising a Blend of a Moisture Cureable Polyurethane Prepolymer and a Radiation Curable Polymer

TABLE 3

| | | 1 | 2 | 3 | 4 | 5 |
|---|---|---|---|---|---|---|
| Bonds pressed to 20 mils and cured at 20 fpm | | | | | | |
| Initial Lap Shear (green strength) (psi) | | 54 | 33 | 57 | 65 | 11 (np)* |
| Initial Lap Shear (green strength) (psi) at 43.3° C. (110° F.) | | 18 | | | | |
| Lap shear strength after 24 hours at 23° C. and 50% Relative Humidity (psi) | | 65 | | | | |
| Lap shear strength after 2 weeks at 23° C. and 50% Relative Humidity (psi) | | 81 | 46 | 71 | 85 | 65 (np)* |
| Lap shear strength after 2 weeks at 140° F. and 100% Relative Humidity and UV exposure(psi) | | 215 | | | | |
| 1lb dead-load at 60° C. (140° F.) for 1 week on 24 hour bonds | | 2 out of 4 passed | | | 4 out of 4 passed | |
| Uncured Composition | Press flow at 100 psi (min/g) | 0.3 | 1 | | 0.07 | |
| | Tg (° C.) | −34 | | | −24 | |
| Cured Composition | Shore A | 45 | | | | 40 |
| | Modulus at 100% Elongation (psi) | | 130 | 90 | 80 | 62 |
| | Tensile strength (psi) | 278 | 250 | 120 | 175 | 150 |
| | Elongation (%) | 198 | 184 | 190 | 160 | 300 |
| | MVTR (g/m²/day) | 8.6 (40 mils film) | | | 9.3 (35 mils) | 6.5 (50 mils) |

*Bonds hand-pressed with uneven thickness

Moisture Curable Polyurethane Prepolymer (MCPP1)

A silane-terminated polyurethane prepolymer is prepared as follows. A reaction vessel equipped with a mechanical stirrer, a thermometer, a condenser and a dry nitrogen inlet is heated to about 60° C.–70° C. and placed under vacuum. Into the reaction vessel is placed, with agitation, a blend of 67.43 g PRIPLAST 3187 polyester diol (Uniqema, (New Castle, Del.) and 4.25 g ALFOL C14 1-tetradecanol (Condea Vista Company, Houston, Tex.), which had previously been heated to about 50° C.–60° C. The reactor contents are then placed under nitrogen and 0.56 g IRGANOX 1010 antioxidant is added. The mixture is mixed under vacuum for one hour while maintaining the contents at about 70° C. to 75° C.

To the mixture in the reaction vessel is then added 14.41 g MONDUR ML blend of 2,4'-diphenylmethane diisocyanate (MDI) and 4,4'-diphenylmethane diisocyanate (50/50) (Bayer Ag, Germany). The reaction vessel is maintained at 75° C. for three hours or until the percent isocyanate content is 1.4%+/−0.3%, as measured according to ASTM D-2572-

Example 6

A sealant composition is prepared as follows. The above-described prepolymer (MCPP1) is preheated to about 50° C.–60° C. for from 1 to 2 hours. Into a reaction vessel, heated to 100° C. and equipped with a mechanical stirrer, a thermometer, a condenser and a dry air inlet, is added 4.3 g ESCOREZ 5690 hydrogenated, aromatic modified, cyclo-aliphatic hydrocarbon resin (ExxonMobil Chemical, Houston, Tex.). After the ESCOREZ 5690 resin is partially melted, 8.5 g of ATEVA 2850 ethylene vinyl acetate is added and mixed under vacuum for 15 to 30 minutes to obtain a uniform mixture. The mixture is maintained at approximately 100° C. and 2.5 g of PARAPOL 1300, 7.4 g of JAYFLEX DTDP, 26.7 g HIPFLEX, and 2.7 g of ULTRAPFLEX is added with mixing. The mixture is mixed under vacuum for one hour. The temperature is then adjusted to from 55° C. to 65° C. and purged with dry air during the addition of 9.8 g prepolymer MCPP1, 35.4 g of CN302 polybutadiene urethane diacrylate, and 0.5 g of SILQUEST A-171, vinyl trimethoxysilane (OSi Specialties-Crompton Corp.). The mixture is then mixed under partial vacuum for one hour.

Then 0.6 g SILQUEST Y11639 1-butanamine-2,2-dimethyl-4-(dimethoxy methylsilyl) amino dimethoxysilane (OSi Specialties-Crompton Corp.), 0.48 g SILQUESt A-171, 0.49 g SILQUEST A-187 and 0.09 g of CGI 819 XF photoinitiator are added with mixing under dry air and maintained at 40° C.–50° C. for 15 to 30 minutes.

The vessel is then placed under dry air and 0.03 g METATIN 740 catalyst (Acima Chemical Industries Limited, Inc., Switzerland) is added and again a vacuum is applied for 5 minutes while mixing.

Examples 7–9

Sealant compositions of Examples 7–9 are prepared according to the method used to prepare the sealant composition of Example 6, with the exception that the components and amounts are as specified in Table 4. The sealant compositions of Examples 6–9 are tested according to the above-described test methods. The results are reported in Table 5.

TABLE 4

| | Example | | | |
|---|---|---|---|---|
| | 6 | 7 | 8 | 9 |
| MCPP1 | 9.8 | 3.83 | 9.75 | 9.7 |
| CN-302 | 35.4 | 30.6 | 19.5 | 19.4 |
| Parapol 1300 | 2.5 | 4.07 | 2.44 | 6.06 |
| EVA 28-800 | 8.5 | 4.45 | 9.75 | 9.7 |
| Escorez 5690 | 4.3 | 2.20 | 4.88 | 4.85 |
| Jayflex DTDP | 7.4 | 12.2 | 7.31 | 18.19 |
| HiPFlex 100 | 26.7 | 36.5 | 39.89 | 26.4 |
| UltraPFlex | 2.7 | 3.6 | 4.0 | 2.64 |
| Silquest A-171 | 0.98 | 0.96 | 0.98 | 0.97 |
| Silquest A-187 | 0.49 | 0.48 | 0.49 | 0.48 |
| Silquest Y-11639 | 0.98 | 0.96 | 0.98 | 0.97 |
| Irgacure CGI 819 XF | 0.09 | .05 | 0.01 | 0.1 |
| Metatin 740 | 0.03 | .03 | 0.03 | 0.03 |

What is claimed is:

1. A dual-cure sealant composition comprising:
    a) a moisture curable, radiation curable polyurethane prepolymer having a number average molecular weight of from about 2,000 to about 15,000 g/mole and a polydispersity index of from about 1.95 to about 6.3, comprising the reaction product of:
        i) a polyol selected from the group consisting of hydrophobic dimer acid-based polyester polyols, polybutadiene polyols, and polyester polyols prepared by reacting excess polyhydric alcohol with isophthalic acid, anhydride, and their esters,
        ii) polyisocyanate, and
        iii) hydrogen active (meth)acrylate;
        said prepolymer comprising less than about 30% molar equivalents acrylate functional groups based on the molar equivalents of the prepolymer, and
    b) at least about 10% by weight filler, wherein said composition exhibits an initial green strength of at least about 10 psi at 110° F. (about 43.3° C., and a modulus at 100% elongation of less than or equal to about 130 psi.

2. A composition according to claim 1 that exhibits an initial green strength of at least about 15 psi at 110° F. (about 43.3° C.).

3. A composition according to claim 1 that exhibits an elongation of at least about 80%, a Tg less than about 10° C., and a moisture vapor transmission rate no greater than about 10 g/m²/day when in the form of a film having a thickness of 60 mils.

4. A composition according to claim 3 that exhibits an elongation of at least about 200%, a Tg less than about –10° C., and a moisture vapor transmission rate no greater than about 8 g/m²/day when in the form of a film having a thickness of 60 mils.

5. A composition according to claim 1 wherein the moisture curable, radiation curable prepolymer is present in an amount of at least about 20% by weight of the composition.

TABLE 5

| | Example | | | |
|---|---|---|---|---|
| | 6 | 7 | 8 | 9 |
| Bonds pressed to 20 mils and cured at indicated (fpm) | 2 × 20 | 2 × 20 | 1 × 20 | 4 × 20 |
| Initial Lap Shear (green strength) (psi) | 25 | 17 | 2 | 11 |
| Initial Lap Shear (green strength) (psi) at 43.3° C. (110° F.) | 15 | | | |
| Lap shear strength after 24 hours at 23° C. and 50% Relative Humidity (psi) | | 19 | 5 | 13 |
| Lap shear strength after 2 weeks at 23° C. and 50% Relative Humidity (psi) | 88 | 47 | 48 | 56 |
| Lap shear strength after 1 week at 60° C. (140° F.) and 100% Relative Humidity and UV exposure (psi) * | 232 | | | |
| Lap shear strength after 1 week of temperature cycling from –40° C. to 71.1° C. (–40° F. to 160° F.) (psi) * | 200 | | | |
| Lap shear strength after 1 week at –° C. (140° F.) and 100 % Relative Humidity (psi) * | 200 | | | |
| Cured Composition Tg (° C.) (Tand peak by DMA) | –32 | | | |
| Shore A | 40 | | | |
| Modulus at 100% Elongation (psi) | 103 | 72 | 91 | 94 |
| Tensile strength (psi) | 150 | 116 | 148 | 128 |
| Elongation (%) | 152 | 165 | 230 | 142 |
| MVTR - 40 mils film (g/m²/day) | 9.3 | | | |

6. A composition according to claim 5 wherein the moisture curable, radiation curable prepolymer is present in an amount of from about 30% to about 60% by weight of the composition.

7. A composition according to claim 1 wherein the filler is selected from the group consisting of fumed silica, amorphous silicon dioxide, talc, calcium carbonates, alumina trihydrate, magnesium carbonate, calcium sulfate, barium sulfate, magnesium hydroxide, clay, mica, titanium dioxide, and combinations thereof.

8. A composition according to claim 7 comprising from about 20% to about 50% by weight filler.

9. A composition according to claim 1 wherein the polymer is a dimer acid-based polyester polyol.

10. A composition according to claim 1 wherein the polyol is a polybutadiene polyol.

11. A composition according to claim 1 further comprising a reactive or non-reactive plasticizer.

12. A dual-cure sealant composition comprising a blend comprising:
   a) a moisture curable polyurethane prepolymer comprising isocyanate functional groups, silane functional groups, or combinations thereof, and having a number average molecular weight of from about 1,500 to about 20,000 g/mole, and
   b) a radiation curable acrylate oligomer derived from polyol selected from the group consisting of polyolefin polyols having a functionality of about 2, polydiene block poiyois having a functionality of about 2, and combinations thereof; and
   c) at least about 20% by weight filler, wherein said composition exhibits an initial green strength of at least about 10 psi at 110° F. (about 43.3° C., and a modulus at 100% elongation of less than or equal to about 130 psi.

13. A composition according to claim 12 that exhibits an initial green strength of at least about 15 psi at 110° F. (about 43.3° C.).

14. A composition according to claim 12 that exhibits an elongation of at least about 80%, a Tg less than about 10° C., and a moisture vapor transmission rate no greater than about 10 g/m²/day when in the form of a film having a thickness of 60 mils.

15. A composition according to claim 14 that exhibits an elongation of at least about 200%, a Tg less than about –10° C., and a moisture vapor transmission rate no greater than about 8 g/m²/day when in the form of a film having a thickness of 60 mils.

16. A composition according to claim 15 wherein the radiation curable polymer is present in an amount greater than about 20% by weight of the composition.

17. A composition according to claim 12 wherein the filler is selected from the group consisting of fumed silica, amorphous silicon dioxide, talc, calcium carbonates, alumina trihydrate, magnesium carbonate, calcium sulfate, barium sulfate, magnesium hydroxide, clay, mica, titanium dioxide, and combinations thereof.

18. A composition according to claim 17 comprising from about 20% to about 50% by weight filler.

19. A composition according to claim 12 further comprising a reactive or non-reactive plasticizer.

20. A dual-cure polyurethane prepolymer having a number average molecular weight of from about 2,000 to about 15,000 g/mole and a polydispersity index of from about 1.95 to about 6.3, comprising the reaction product of:
   a) a polyol selected from the group consisting of hydrophobic dimer acid-based polyester polyols, polybutadiene polyols, and polyester polyols prepared by reacting excess polyhydric alcohol with isophthalic acid, anhydride, and their esters,
   b) polyisocyanate, and
   c) hydrogen active (meth)acrylate, said prepolymer comprising less than about 30% molar equivalents acrylate functional groups based on the molar equivalents of the prepolymer.

21. A composition according to claim 20 wherein the prepolymer comprises less than about 20% molar equivalents acrylate functional groups based on the molar equivalents of the prepolymer.

22. A composition according to claim 21 wherein the prepolymer comprises less than about 15% molar equivalents acrylate functional groups based on the molar equivalents of the prepolymer.

23. A composition according to claim 20 wherein the polyol is a dimer acid-based polyester polyol or a polybutadiene polyol.

24. A dual-cure polyurethane prepolymer having a number average molecular weight of from about 2,000 to about 15,000 g/mole and a polydispersity index of from about 1.95 to about 6.3, comprising the reaction product of:
   a) a polyol selected from the group consisting of hydrophobic dimer acid-based polyester polyols, polybutadiene polyols, and polyester polyols prepared by reacting excess polyhydric alcohol with isophthalic acid, anhydride, and their esters
   b) polyisocyanate,
   c) hydrogen active (meth)acrylate, and
   d) hydrogen active organofunctional silane, said prepolymer comprising less than about 15% molar equivalents silane functional groups based on the molar equivalents of the prepolymer.

25. A composition according to claim 24 wherein the prepolymer comprises less than about 10% molar equivalents silane functional groups based on the molar equivalents of the prepolymer.

26. A composition according to claim 25 wherein the prepolymer comprises less than about 5% molar equivalents silane functional groups based on the molar equivalents of the prepolymer.

27. A composition according to claim 26 wherein the prepolymer comprises less than about 15% molar equivalents acrylate functional groups based on the molar equivalents of the prepolymer.

28. A composition according to claim 27 wherein the polyol is a dimer acid-based polyester polyol or a polybutadiene polyol.

29. A dual-cure sealant composition comprising:
   a) polyurethane prepolymer comprising isocyanate functional groups, silane functional groups, or combination thereof, and having a number average molecular weight of from about 1,500 to about 20,000 g/mole; and
   b) acrylate oligomer derived from polyol selected from the group consisting of polyolefin polyols having a functionality of about 2, polydiene block polyols having a functionality of about 2, and combinations thereof,
   wherein said composition exhibits an initial green strength of at least about 10 psi at 110° F. (about 43.3° C., and a modulus at 100% elongation of less than or equal to about 130 psi.

30. A composition according to claim 29 that exhibits an initial green strength of at least about 15 psi at 110° F. (about 43.3° C.).

31. A composition according to claim 29 further comprising at least about 20% by weight filler.

32. A composition according to claim 29 further comprising a reactive or non-reactive plasticizer.

33. A composition according to claim 29 wherein the polyurethane prepolymer is present in the composition in an amount of from about 1% to about 20% by weight.

34. A composition according to claim 33 wherein the sealant composition exhibits an elongation of at least about 80%, a Tg less than about 10° C., and a moisture vapor transmission rate no greater than about 10 g/m²/day when in the form of a film having a thickness of 60 mils.

35. A composition according to claim 34 wherein the sealant composition exhibits an elongation of at least about 200%, a Tg less than about −10° C., and a moisture vapor transmission rate no greater than about 8 g/m²/day when in the form of a film having a thickness of 60 mils.

36. A composition according to claim 35 wherein the polyurethane prepolymer is present in the composition in an amount of from about 3% to about 10% by weight.

37. A composition according to claim 36 wherein acrylate oligomer is present in the composition in an amount of from about 5% to about 35% by weight.

38. An insulating glass assembly that includes at least two panes of glass, a spacer, and a sealant composition, said glass being bonded to said spacer through said sealant composition, said sealant composition comprising at least one of a) a moisture curable, radiation curable polyurethane prepolymer having a number average molecular weight of from about 2,000 to about 15,000 g/mole and a polydispersity index of from about 1.95 to about 6.3, comprising the reaction product of:
  i) a polyol selected from the group consisting of hydrophobic dimer acid-based polyester polyols, polybutadiene polyols, and polyester polyols prepared by reacting excess polyhdric alcohol with isophthalic acid, anhydride, and their esters,
  ii) polyisocyanate, and
  iii) hydrogen active (meth)acrylate; said prepolymer comprising less than about 30% molar equivalents acrylate functional groups based on the molar equivalents of the prepolymer, or b) a blend comprising a moisture curable polyurethane prepolymer comprising isocyanate functional groups, silane functional groups, or combinations thereof, and having a number average molecular weight of from about 1,500 to about 20,000 g/mole, and a radiation curable acrylate oligomer derived from polyol selected from the group consisting of polyolefin polyols having a functionality of about 2, polydiene block polyols having a functionality of about 2, and combinations thereof, wherein said composition exhibits an initial green strength of at least about 10 psi at 110° C., and a modulus at 100% elongation of less than or equal to about 130 psi.

39. An insulating glass assembly according to claim 38 wherein the sealant composition is a dual-cure sealant composition comprising:
  a) the moisture curable, radiation curable polyurethane prepolymer; and
  b) at least about 20% by weight filler.

40. An insulating glass assembly according to claim 38 wherein the sealant composition comprises a blend comprising:
  a) the moisture curable polyurethane prepolymer, and
  b) the radiation curable polymer; and
  c) at least about 20% by weight filler.

41. An insulating glass assembly according to claim 38 wherein the sealant composition comprises a dual-cure polyurethane prepolymer having a number average molecular weight of from about 2,000 to about 15,000 g/mole and a polydispersity index of from about 1.95 to about 6.3, comprising the reaction product of:
  a) a polyol selected from the group consisting of hydrophobic dimer acid-based polyester polyol and polybutadiene polyol, or a combination thereof,
  b) polyisocyanate, and
  c) hydrogen active (meth)acrylate, said prepolymer comprising less than about 15% molar equivalents acrylate functional groups based on the molar equivalents of the prepolymer.

42. An insulating glass assembly according to claim 38 wherein the sealant composition comprises a dual-cure polyurethane prepolymer having a number average molecular weight of from about 2,000 to about 15,000 g/mole and a polydispersity index of from about 1.95 to about 6.3, comprising the reaction product of:
  a) a polyol selected from the group consisting of hydrophobic dimer acid-based polyester polyols and polybutadiene polyols, or a combination thereof,
  b) polyisocyanate,
  c) hydrogen active (meth)acrylate, and
  d) hydrogen active organofunctional silane, said prepolymer comprising less than about 15% molar equivalents silane functional groups based on the molar equivalents of the prepolymer.

43. An insulating glass assembly according to claim 42 wherein the prepolymer comprises less than about 5% molar equivalents silane functional groups based on the molar equivalents of the prepolymer, and the prepolymer comprises less than about 15% molar equivalents acrylate functional groups based on the molar equivalents of the prepolymer.

* * * * *